(12) United States Patent
Gillespie et al.

(10) Patent No.: US 6,367,022 B1
(45) Date of Patent: Apr. 2, 2002

(54) POWER MANAGEMENT FAULT STRATEGY FOR AUTOMOTIVE MULTIMEDIA SYSTEM

(75) Inventors: Douglas Brian Gillespie, Sterling Heights; John Frank Konstantine, Dearborn; David P. Wright, Redford, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/353,684

(22) Filed: Jul. 14, 1999

(51) Int. Cl.[7] .............................. G06F 1/26; G06F 1/32
(52) U.S. Cl. ........................ 713/300; 713/320; 701/1; 307/31
(58) Field of Search ................................ 713/300, 310, 713/320, 323, 324; 701/1, 24; 307/10.1, 31; 714/14; 700/286; 322/28; 340/428; 180/54.1; 323/282, 285; 320/104, 137; 711/112

(56) References Cited

U.S. PATENT DOCUMENTS

| | | | |
|---|---|---|---|
| 4,698,748 A | | 10/1987 | Juzswik et al. |
| 5,560,022 A | | 9/1996 | Dunstan et al. |
| 5,595,121 A | * | 1/1997 | Elliott et al. |
| 5,680,308 A | | 10/1997 | Warren |
| 5,907,194 A | * | 5/1999 | Schenk et al. |
| 5,928,292 A | * | 7/1999 | Miller et al. |
| 6,181,118 B1 | * | 1/2001 | Meehan et al. |

OTHER PUBLICATIONS

Entertainment and information merge in the automobile, William C. Spelman, Delco Electronics, Co., IEEE Vehicular Technology Society News, Feb., 1996, pp. 49–55.

* cited by examiner

Primary Examiner—Gopal C. Ray
(74) Attorney, Agent, or Firm—Larry I. Shelton

(57) ABSTRACT

A multimedia/personal computer-based system for operating information, communication, and entertainment devices in a mobile vehicle uses a power management strategy which reduces power consumption and boot-up time in a manner which facilitates use of a complex instruction set computing (CISC) processor system. A power management fault strategy detects fault conditions and restores proper operation without user intervention. A low power microprocessor off-board of the main motherboard switches a plurality of regulated voltages to the main motherboard and other devices. The main application microprocessor on the main motherboard sends periodic status messages to the low power microprocessor. If a time limit between successive status messages is exceeded, then the low power microprocessor takes corrective action such as sending messages to the main application microprocessor, sending a wakeup sequence (resume event) to the main application processor, sending a reset signal to the main application microprocessor, or removing or cycling the regulated voltages being provided to the main motherboard.

6 Claims, 5 Drawing Sheets

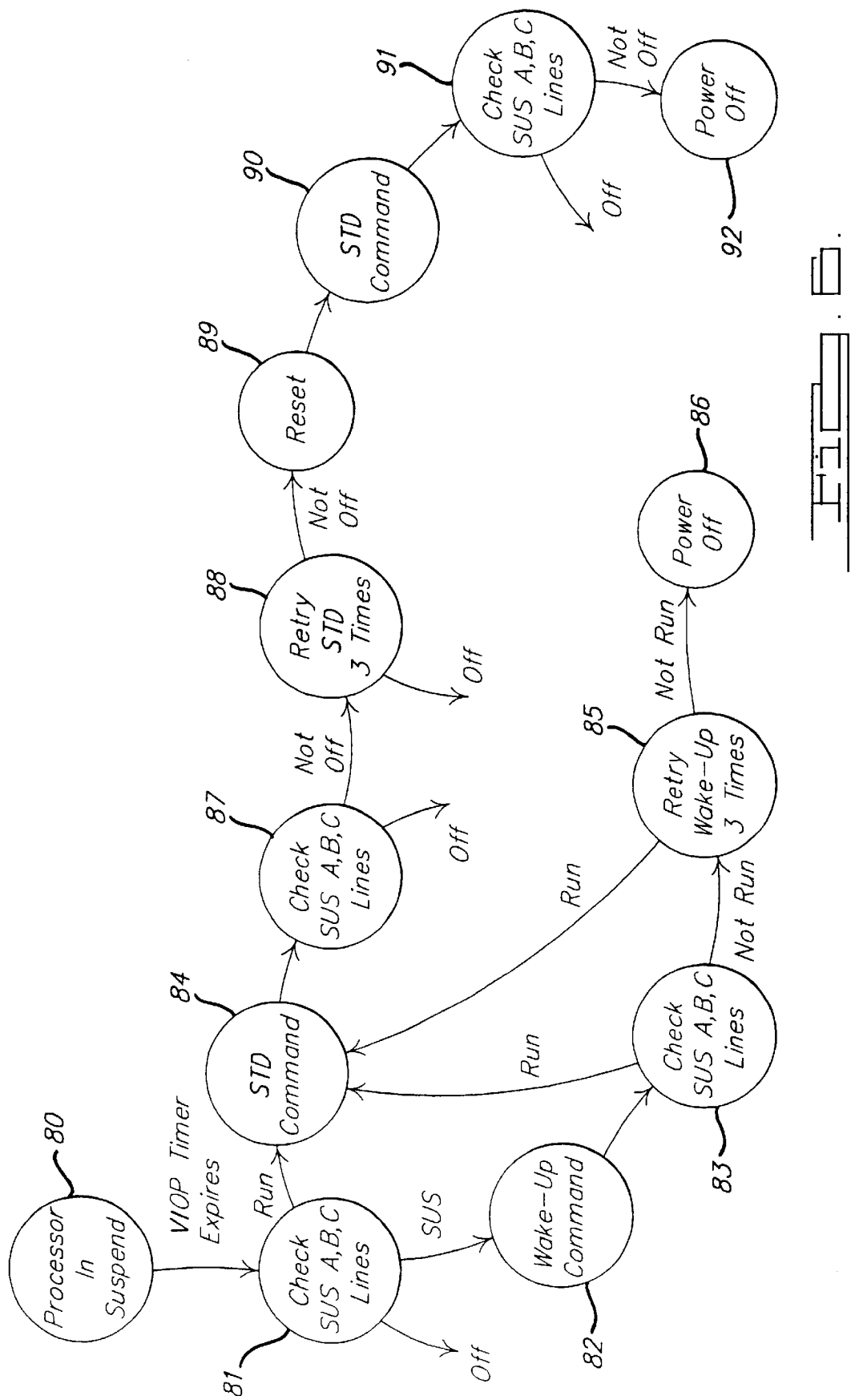

POWER MANAGEMENT FAULT STRATEGY FOR AUTOMOTIVE MULTIMEDIA SYSTEM

This application is related to co-pending U.S. Ser. No. 09/353,685, entitled "Power Management for Automotive Multimedia System," filed concurrently herewith.

BACKGROUND OF THE INVENTION

The present invention relates in general to a method and apparatus for supplying power to an automotive multimedia/personal computer system, and, more specifically, to a power management fault strategy for detecting fault conditions and restoring proper operation without user intervention.

Power management is an important issue in portable computing devices. This is especially true in mobile vehicles which have a limited battery capacity and which have stringent current limitations. As microprocessor-based systems become more powerful by using larger microprocessors and using a greater number of peripheral devices, power requirements increase. In vehicles containing an internal combustion engine and alternator, electric power generation may be sufficient to operate without much difficulty. In vehicles using other power plants or in an internal combustion engine vehicle with the engine shut off, significant limitations may be placed on current consumption (both normal operating current and quiescent current) of the multimedia/PC system.

Partly due to available power limitations, microprocessors having low power requirements are normally used in mobile vehicles. As mobile computing functions have been introduced into vehicles, reduced instruction set computing (RISC) microprocessors have been chosen since they are smaller and consume less power. Thus, complex instruction set computing (CISC) microprocessors such as Intel Pentium (x86) microprocessors and the Motorola 680x0 family of microprocessors have been avoided. However, RISC microprocessors often cannot run the same software as has been created for CISC microprocessors. Availability of operating system and applications software is much greater for CISC microprocessors because of the popularity of desktop and laptop personal computers. Therefore, it would be very beneficial to use a CISC microprocessor in a mobile vehicle.

An important performance issue for a multimedia/personal computer based system in a mobile vehicle is boot-up time. A multimedia system may be providing information, communication, entertainment, or other functions which the vehicle user may expect to be available as soon as the vehicle ignition switch is turned on. By example, the multimedia system may include a navigation function and the driver may want to initiate input of a desired destination as soon as possible after turning on the vehicle. By maintaining full or partial power to the multimedia system, boot-up time can be reduced or eliminated, but this conflicts with the need to minimize power consumption. CISC microprocessors such as the Pentium typically have reduced power states in which processing operations are suspended while the state of the memory and the internal microprocessor state are stored. Such a reduced power state may be entered in response to various conditions monitored by the microprocessor. However, the microprocessor can't go completely to sleep and still monitor the conditions which should wake it up. Furthermore, if the microprocessor has sole responsibility to conduct its own power management, then there is limited ability to recover from errors.

Co-pending application U.S. Ser. No. 09/353,685 describes a vehicle input/output processor (VIOP) using a low power microprocessor to manage power for a main application microprocessor. Various operating states of the main application microprocessor and the low power microprocessor facilitate low current consumption while a vehicle ignition is off, fast boot-up times when the ignition is on, and intermediate boot-up times if the ignition has been off (but not if it has been off for a long period of time, such as 24 hours). However, if the main application processor malfunctions, the proper operating states may not be obtained and unacceptable current consumption may result.

SUMMARY OF THE INVENTION

The present invention has the advantages of providing efficient and robust power management of an in-vehicle multimedia/personal computer-based system, while detecting fault conditions and restoring proper operation without user intervention.

In one aspect of the invention, a method of powering a vehicle information, communication, and entertainment system is provided for mobile operation of information, communication, and entertainment devices in a vehicle. The vehicle has a vehicle powered state and a vehicle unpowered state. The method includes operating a power management chipset mounted on a main motherboard to control power to a main application microprocessor and a random access memory mounted on the main motherboard. A plurality of regulated voltages are supplied from a power controller and regulator to the power management chipset. The regulated voltages are switched on and off under control of a reduced power microprocessor in response to the user control and whether the vehicle is in the vehicle powered state or the vehicle unpowered state. A status message is periodically transmitted from the main application microprocessor to the reduced power microprocessor during normal full-powered operation of the main application microprocessor. A predetermined time period is established in the reduced power microprocessor during which a status message is expected to be received from the main application processor. A reset signal is sent from the reduced power microprocessor to the main application microprocessor if the status message is not received during the predetermined time period.

BRIEF DESCRIPTION OF THE DRAWINGS

FIG. 6 is a state diagram showing fault management during shutdown to the suspend-to-disk state of the main application microprocessor.

DETAILED DESCRIPTION OF PREFERRED EMBODIMENTS

Figure 1:
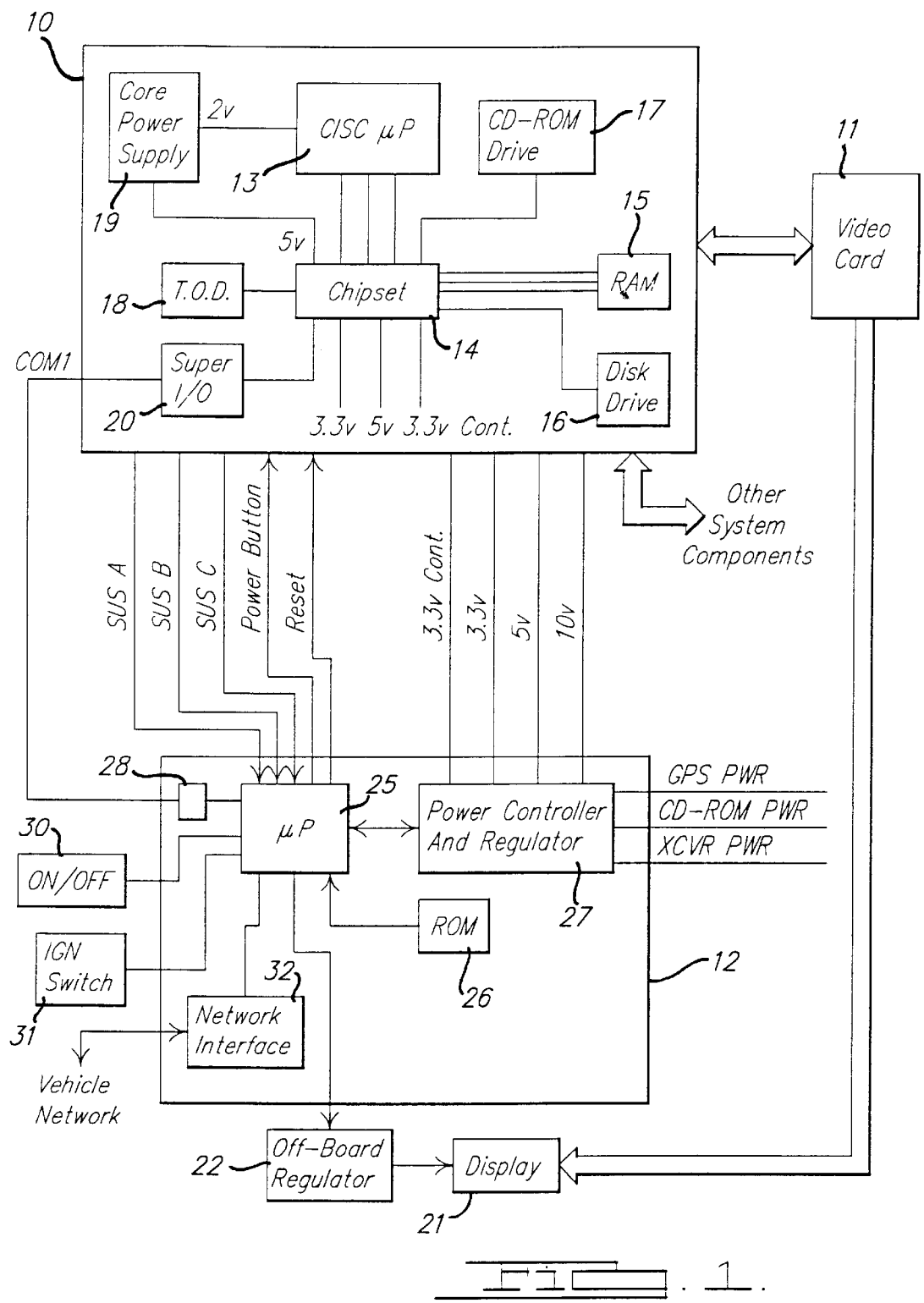
FIG. 1 is a block diagram showing a multimedia system employing the power management strategy of the present invention.

Referring to FIG. 1, a motherboard 10 is connected to a video processor card 11 and a vehicle input/output processor (VIOP) board 12. Motherboard 10 includes a complex instruction set computing (CISC) processor 13 which may comprised of an Intel Celleron processor, for example. A support chip set 14 is connected to processor 13 and is adapted to function specifically with microprocessor 13. Support chip set 14 may be one or more integrated circuits and may preferably be comprised of north and south portions of an Intel Banister Bridge.

Chip set 14 provides interfaces between processor 13 and various other devices and provides local power management for processor 13. Support chip set 14 includes a DRAM memory controller for controlling a DRAM memory 15. Chip set 14 also includes interface controllers for a mass storage devices such as a hard drive 16 and a CD-ROM drive 17. Processor 13 is a main application processor and executes operating system software and application programs contained on hard drive 16 and/or CD-ROM drive 17.

A time of day (TOD) unit 18 is connected to chip set 14 and keeps track of time of day in a conventional manner. A low quiescent current regulator that operates off of the vehicle battery (not shown) is preferably provided to maintain operation of TOD unit 18 even when power is off to motherboard 10.

Chip set 14 receives several different regulated voltages from VIOP 12 as is described below. Chip set 14 helps control the regulated voltages to provide power to processor 13 and DRAM 15 according to its own, conventional power management strategy. Motherboard 10 may further include a core power supply 19 driven by chip set 14 to provide a regulated voltage at a value not being supplied by VIOP 12.

A super-input/output (I/O) interface 20 is connected to chip set 14 and provides a serial communications port COM1 which is connected to VIOP 12. The serial communications link carries messages between processor 13 and VIOP 12 relating to power management and to input and output data and control signals.

Motherboard 10 includes other conventional components which are not shown such as a BIOS unit and standard bus interfaces such as ISA, PCI, and USB interfaces. Video card 11 may be connected to a PCI expansion slot, for example. Video card 11 includes a video output connected to a display 21 which is powered by an off-board regulator 22 under control of VIOP 12.

VIOP 12 includes a reduced power microprocessor 25 which executes program instructions contained in a read-only memory (ROM) 26, for example. Reduced power microprocessor 25 may be comprised of a Motorola 68 HC 912 processor, for example, or other low power processor of the type often used on automotive applications. A principle job of processor 25 is to control a power controller and regulator 27 which has a plurality of switched and unswitched regulated voltage outputs. For example, switched outputs of 3.3V, 5V, and 10V are provided along with an unswitched (i.e., continuous) supply of 3.3V. Each of these regulated voltages is provided to main motherboard 10 and then distributed to various components which use them, including chip set 14. These voltages are used to operate microprocessor 13, power memory 15 for refreshing and accessing memory contents, and for powering portions of chip set 14 itself. In addition, power may be directly supplied to hard drive 16, CD-ROM 17 and TOD unit 18.

Power controller and regulator 27 may also provide regulated voltages to devices located remotely from motherboard 10 and VIOP 12. For example, a separate, remote module may include a GPS receiver and a wireless data transceiver receiving GPS power (GPS PWR) and transceiver power (XCVR PWR) from power controller and regulator 27.

VIOP 12 includes a physical interface 28 for providing a serial port connection for microprocessor 25 to communicate with the COM1 port of motherboard 10. In addition, there are several direct communication lines connected between motherboard 10 and microprocessor 25. Microprocessor 25 provides a power button signal in response to an on/off switch 30 controlled by the user to indicate when to place the multimedia system in an in-use condition, and a reset signal for causing the main application processor 13 to reboot. Chip set 14 provides three distinct signals SUS A, SUS B, and SUS C, which identify the suspended power state in which the power management strategy of chip set 14 is operating.

Microprocessor 25 also receives a signal from an ignition switch 31 to identify whether the vehicle is in a powered state or an unpowered state. Based upon the state of ignition switch 31 and on/off switch 30, microprocessor 25 and microprocessor 13 each determine an appropriate power state for main application processor 13 and chip set 14. Depending upon the current state and next desired state of microprocessor 13 and chip set 14, microprocessor 25 may merely verify that the correct state has been implemented by chip set 14, it may command a different state over the serial communication link, or it may switch the state of power controller and regulator 27 to provide different regulated voltages to main motherboard 10. Also based upon the state of various switches or other inputs, microprocessor 25 may control the switching on and off of off-board regulator 22 for powering display 21 as appropriate.

A network interface 32 is contained in VIOP 12 and is connected to microprocessor 25. Network interface 32 may be connected to a vehicle network for exchanging data and control signals between motherboard 13 and a vehicle communication or multiplex network (also using the serial communication link between motherboard 10 and VIOP 12).

Figure 2:
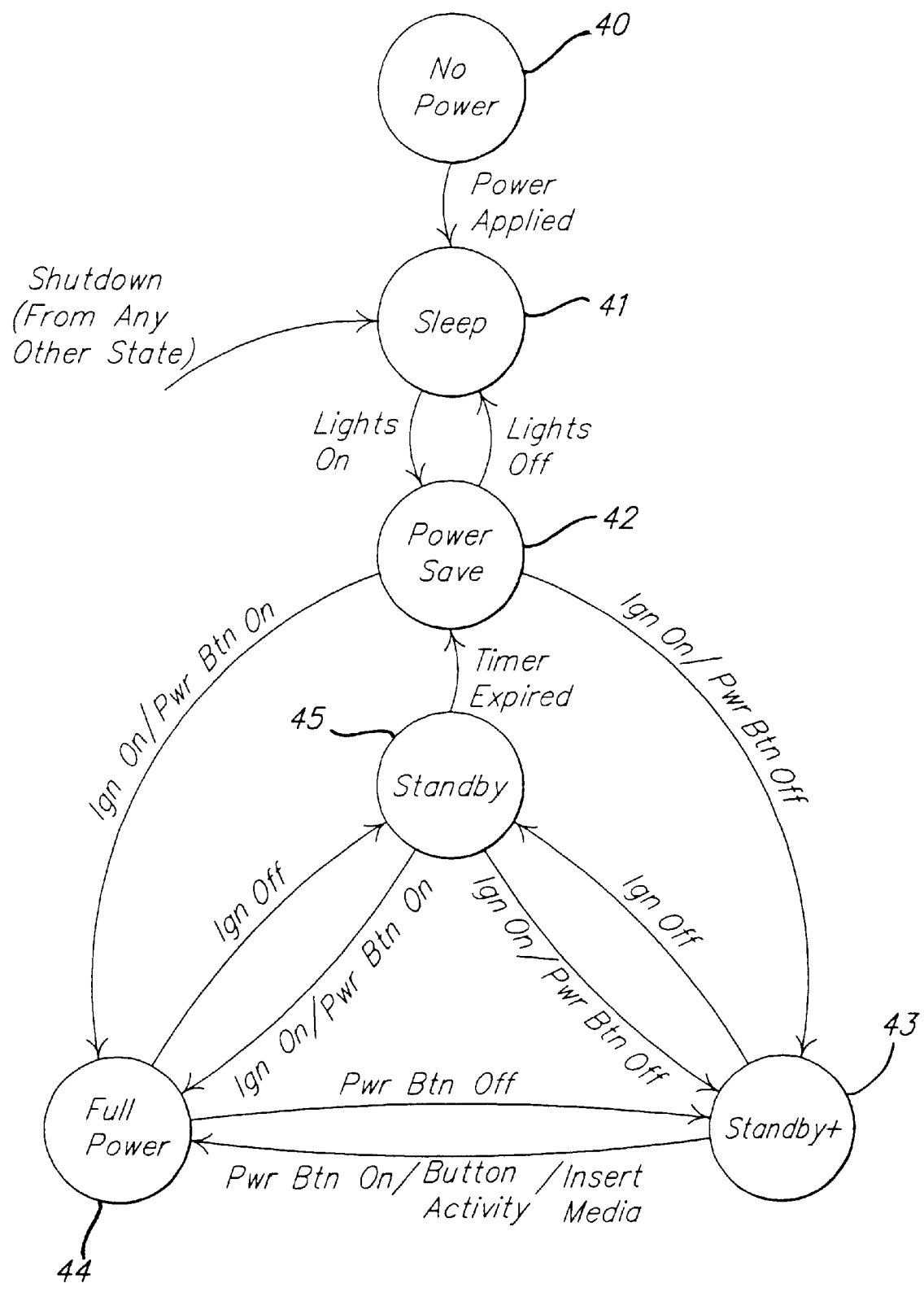
FIG. 2 is a state diagram showing state transitions of the system in FIG. 1.

Operation of the power management strategy for the multimedia system will be described in connection with the state diagram of FIG. 2. Prior to application of any power, the multimedia system is in No Power state 40. In No Power state 40, main battery power is disconnected and all units are off. Once power is applied, the multimedia system transitions to a Sleep state 41. Sleep state 41 is characterized by the following conditions: ignition is off, the VIOP unit is asleep, the main microprocessor and chip set are off, the display is off, remote wireless and GPS units are off, CD-ROM unit is off, and display backlighting is off (backlighting refers to background lighting of an LCD display and is desirable to provide general panel lighting of a vehicle dashboard during low light conditions even though the unit itself is off). During Sleep state 41, if the vehicle external lights such as headlights are turned on, then it is desirable to supply backlighting power for the display. Thus, a lights-on condition triggers a transition to a Power Save state 42 in which the VIOP unit is awake and can control backlighting power to the display. When the lights then go off, a transition is made to return to Sleep state 41.

Transition may be made to Sleep state 41 from any other state during a shutdown caused by an error or lock-up condition of the main microprocessor causing it to fail to respond to VIOP messages. In that case, the VIOP processor shuts down all switched power to main motherboard 10 thereby initiating Sleep state 41.

Power Save state 42 is characterized by the following conditions: ignition is off, VIOP unit is awake, main application processor and chip set are asleep in a suspend-to-disk state (referred to as a D3 state for an Intel Celleron chipset/

ACPI spec), the display is off, wireless and GPS transceivers are off, CD-ROM unit is off, and display backlighting may or may not be on depending upon other vehicle settings (e.g., headlights). When the vehicle ignition turns on, a transition will be made out of Power Save state 42 depending upon the status of the on/off power button on the multimedia unit itself. If the power button is off, then a transition is made to Standby+ state 43. If the power button is on, then a transition is made to Full Power state 44. Standby+ state 43 is characterized by the following conditions: ignition is on, VIOP unit is awake, main processor and chip set are on, display is off, wireless data transceiver is off, GPS unit is on, CD-ROM unit is off, and backlighting of the display is dependent on other lamp states. While in Standby+ state 43, a transition may be made to Full Power state 44 in response to the turning on of the power button, activity on any other button controls of the multimedia system as appropriate, or the insertion of a media such as a CD audio disc. If the ignition switch is turned off while in Standby+ state 43, a transition is made to Standby state 45.

Standby state 45 is characterized by the following conditions: ignition is off, VIOP unit is awake, the main processor and chip set are asleep in the suspend-to-RAM state (designated as state S3 in the Intel Celleron power management strategy), display is off, wireless transceiver and GPS receiver are off, CD-ROM unit is off, and display backlighting depends upon vehicle lamps. When in Standby state 45, a fairly low quiescent current consumption of about 100 mA may be obtained. Although this current draw is fairly low, it is higher than can be maintained for extremely long periods in a vehicle which must rely on its main battery for starting the vehicle internal combustion engine. Therefore, Standby state 45 includes operating of the time of day timer in order to detect a predetermined period of time, after which a transition is made to Power Save state 42. In Power Save state 42, the main processor and chip set switch to the suspend-to-disk condition and since the DRAM memory does not need to be continuously refreshed, the power consumption may drop to about 4 mA.

In a preferred embodiment, the predetermined period of time is about 24 hours. If the vehicle is restarted within 24 hours, the current state of memory will still be in DRAM and a much faster boot-up of the system can be achieved (a boot-up time of about one to two seconds as opposed to a boot-up time of from 6 to 10 seconds from the suspend-to-disk condition). If the ignition switch is turned on while in Standby state 45, a transition is made to Standby+ state 43 or Full Power state 44 depending upon the position of the power button.

In the Full Power state 44, all units are on and fully awake. If the power button is turned off while in Full Power state 44, a transition is made to Standby+ state 43. If the ignition switch is turned off while in Full Power state 44, then a transition is made to Standby state 45.

The main microprocessor and chip set may have many different suspend or low power states. In the preferred embodiment of the present invention, the suspend-to-RAM and suspend-to-disk power states are preferred to be used. In the suspend-to-RAM (S3) power state, an instant on and boot-up time of between 1 and 2 seconds is achieved. During this power state, the DRAM is in a self refresh mode. In the preferred embodiment using an Intel Celleron processor and a Bannister Bridge chip set, the chip set is configured so that about 80% of the chip set is turned off. Specifically, the north bridge SUSPEND well is powered, the DRAM lines are set for self refresh mode, and the south bridge interrupt controller and power controller have power (i.e., RTC well and SUSPEND well) while the Pentium processor is off. The suspend-to-RAM state draws between 50 and 70 mA of current and the state may be exited by pressing the power button while the ignition is on, by a reset signal from the VIOP, or by other programmed resume events.

In the suspend-to-disk (D3) power state, an image or snapshot of the DRAM memory contents is stored to disk (preferably a compact flash drive). The north bridge of the chip set is powered down and the south bridge is mostly powered down except for the south bridge section that has power control (i.e., south bridge SUSPEND well and RTC well). Current draw is between 1 and 2 mA in this power state. Current draw results in part from the need to drive the SUS A, B, and C lines for giving the power state status of the main controller and chip set.

The serial communications link between microprocessors 13 and 25 carries various types of messages, such as input/output data and control signals for various peripheral devices. In addition, fault management and status messages are communicated to permit reduced power microprocessor 25 to ensure proper operation of the multimedia system. Thus, if the main application microprocessor becomes "locked-up" or "frozen," this is detected by the reduced power microprocessor and action can be taken to restore proper operation without requiring user intervention. Furthermore, if the main application microprocessor assumes a power state other than the one required by the power management strategy, this is detected and, if not correctable, then the reduced power microprocessor avoids possible excessive current consumption by shutting off most power to the main application microprocessor.

The fault management strategy of the present invention employs a status message (or "heartbeat" message) that is programmed to be sent periodically by the main application microprocessor to the reduced power microprocessor whenever the main application microprocessor is running (i.e., operating in the Full Power state or the Standby+ state). When the processor is first booted up, there will be some delay before it is able to send its first heartbeat message. Thereafter, the main application processor is programmed to generate a regular heartbeat message (e.g., every 5 seconds). If the reduced power microprocessor fails to receive an expected heartbeat message within this predetermined time, then the main application processor is assumed to have malfunctioned and corrective action is taken.

Figure 3:
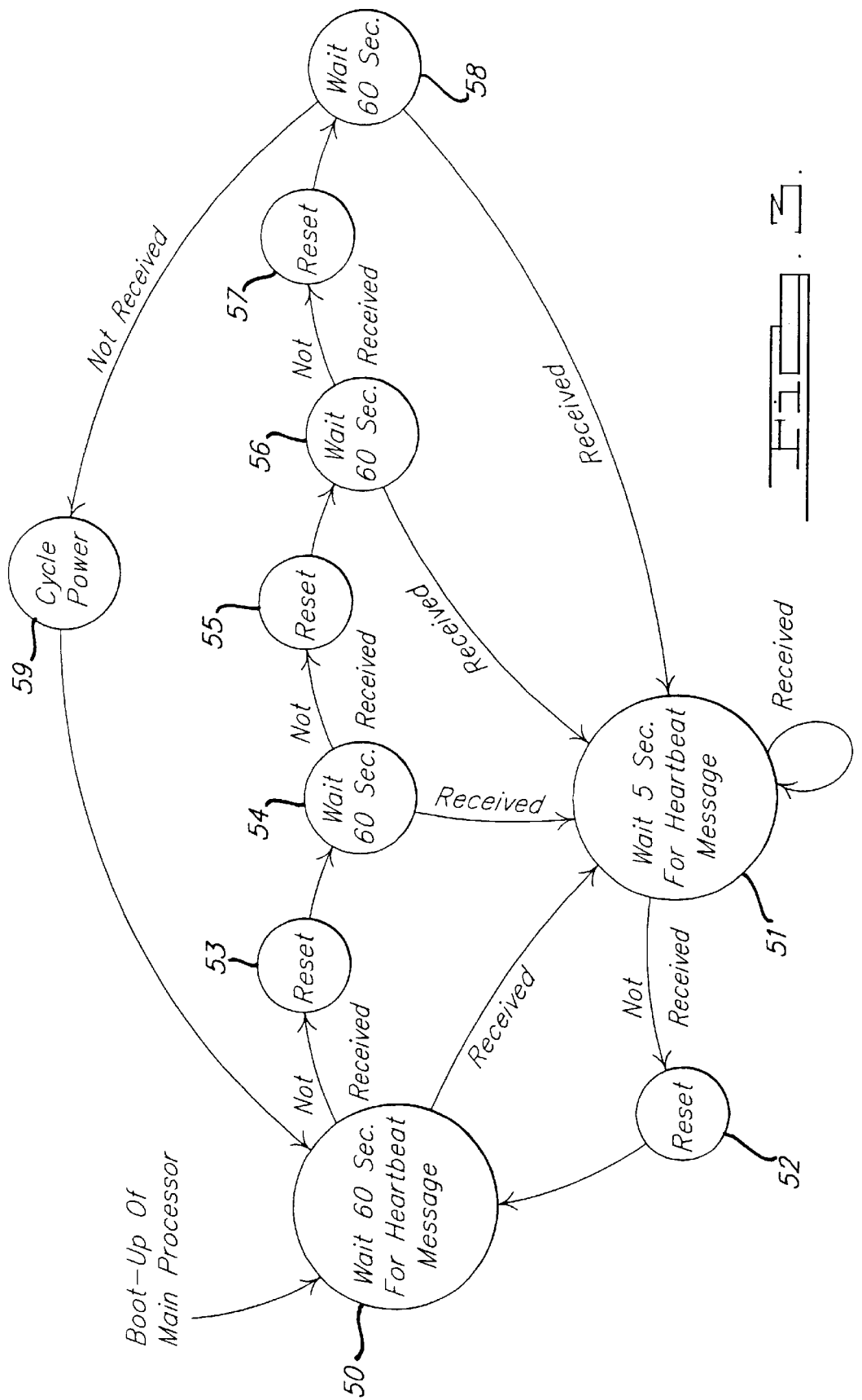
FIG. 3 is a state diagram showing monitoring of heartbeat messages during full-power operation.

This portion of the fault strategy is shown in greater detail in FIG. 3. After initiation of a boot-up of the main application processor, the fault strategy enters a state 50 wherein a waiting period is established within the reduced power microprocessor of 60 seconds. During this 60 second time period, a heartbeat message would be expected from the main application processor if boot-up to a normal running state is achieved. If, as expected, a heartbeat message is received during the 60 second time period, then a shorter waiting period of 5 seconds is established in a state 51. If a heartbeat message is received during the shorter waiting period, then the fault strategy stays in state 51 with a reinitiation of the 5 second waiting period. If a heartbeat message is not detected by the reduced power microprocessor during the 5 second waiting period, then it enters state 52 and sends a reset signal to the main application processor to re-boot it. Then the reduced power microprocessor returns to state 50 to establish the 60 second waiting period.

If a heartbeat message is not received during the 60 second time period in state 50, then a series of resets followed by additional 60 second waiting periods are established in states 53 through 58. If a heartbeat message is received while in states 54, 56, or 58, then normal operation results in state 51. If on the final try in state 58 no heartbeat message is received, then the regulated voltages supplied to the main motherboard by the VIOP power controller and regulator are cycled off and then back on in an attempt to recover proper operation of the main application microprocessor. Then the main application microprocessor attempts to restart or re-boot, and the fault strategy returns to state 50.

Figure 4:
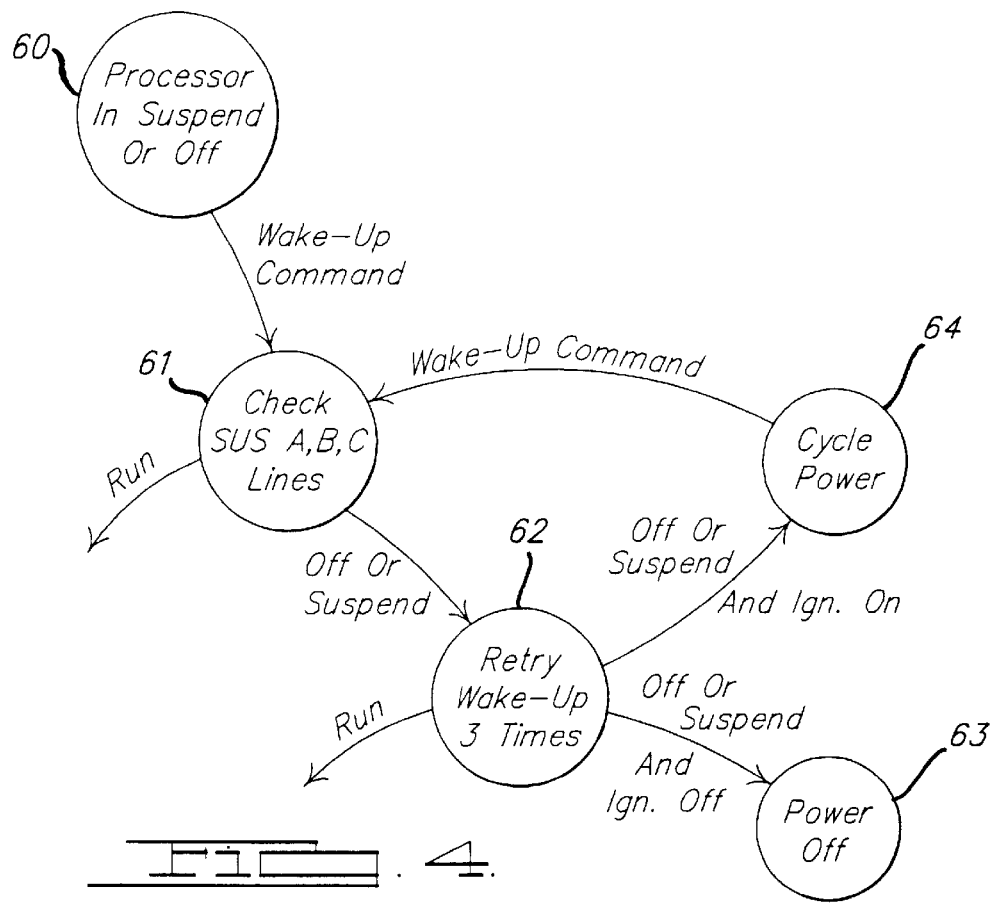
FIG. 4 is a state diagram showing fault management during wake-up of the main application microprocessor.

A portion of the fault strategy of the present invention active during an attempt to wake up the main application processor from a suspend-to-disk (OFF or D3) condition or a suspend-to-RAM (SUSPEND or S3) condition is shown in FIG. 4. The main application microprocessor is in SUSPEND or OFF initially in state 60. A transition to state 61 is made in response to a wake-up command. Such a wake-up command may be a signal generated by any devices in the system such as a user control push button (e.g., power button), the vehicle ignition switch, or insertion of a media (e.g., CD-ROM, CD audio, or cassette tape). The reduced power microprocessor monitors these conditions and determines when existing conditions should wake the main application processor to its full-powered operating state and then generates the resume/wakeup command to the main application processor/motherboard. Then, in state 61, it checks status lines SUS A, B, and C, to determine the power state of the main application processor. If these lines indicate a run state, then no further action is taken. However, if these lines indicate an OFF or SUSPEND state, then the reduced power microprocessor exercises its own wake-up sequence (i.e. resume event) to the main application processor/chipset in state 62. The wake-up sequence/command (resume event) is retried up to 2 more times (after sufficient waiting periods) if the command is unsuccessful. After the final try, then the state of the vehicle ignition is determined. If the ignition is off, then there should be no further consumption of current and the regulated voltages are turned off in state 63. On the other hand, if the ignition is on then the regulated voltages are cycled off and back on in state 64 in an attempt to restore proper system operation. Then another wake-up sequence (resume event) is initiated and a return is made to state 61.

Figure 5:
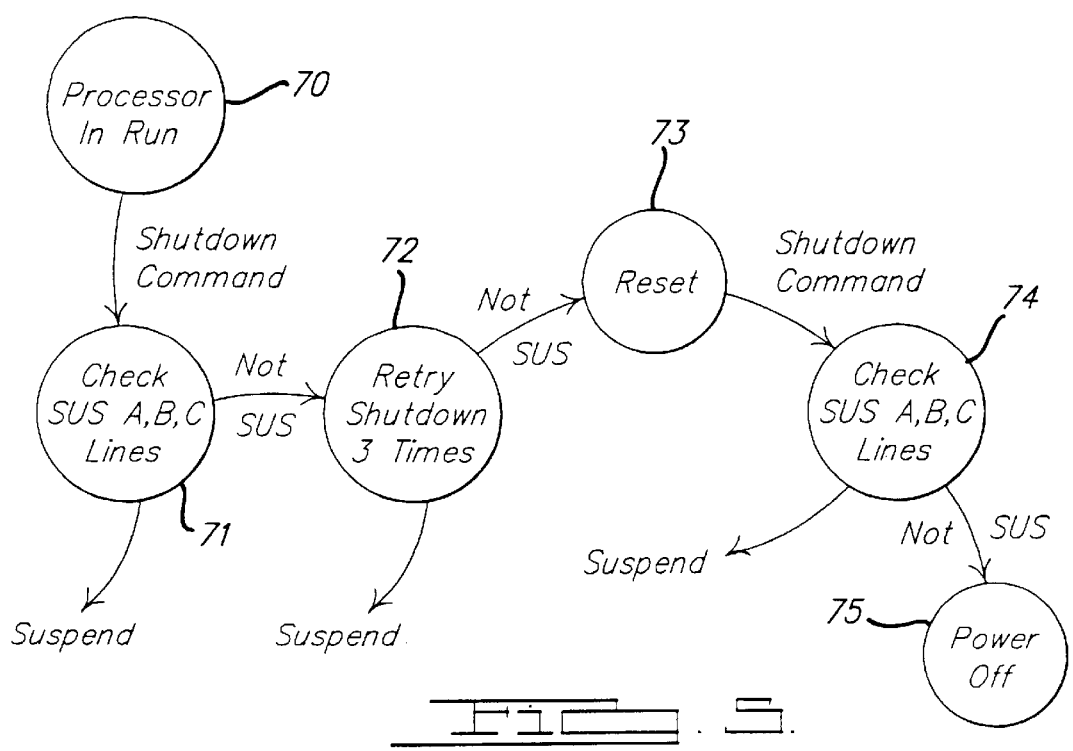
FIG. 5 is a state diagram showing fault management during shutdown to the suspend-to-RAM state of the main application microprocessor.

A portion of the fault strategy of the present invention active during an attempt to shutdown the main application processor to a suspend-to-RAM (SUSPEND or S3) condition from a full-on condition is shown in FIG. 5. Proper shutdown to the SUSPEND condition is important in order to ensure limited current consumption when not in use and to limit boot-up time the next time the vehicle ignition switch is activated (i.e., within the next 24 hours).

In state 70, the main application processor is in a full-on or run condition. A transition to state 71 is made in response to a shutdown command. Such a shutdown command may be the signal generated by the vehicle ignition switch being turned to its off position. The reduced power microprocessor monitors the ignition switch, determines when the main application processor should be going to its suspended operating state, a generates a shutdown sequence to the main motherboard. Then, in state 71, it checks status lines SUS A, B, and C, to determine the power state of the main application processor. If these lines indicate a SUSPEND state, then no further action is taken. However, if these lines indicate a run state, then the reduced power microprocessor transmits its own shutdown command over the serial communication link in state 72. The shutdown command is retried up to 2 more times (after sufficient waiting periods) if the initial command is unsuccessful. After the last try and if the SUSPEND condition is still not achieved, then a reset signal is sent to the main application microprocessor in state 73. After reset, a further shutdown command is sent and the SUS A, B, and C lines are checked again in state 74. If the SUSPEND condition is still not achieved, then the regulated voltages are powered off in state 75.

A portion of the fault strategy of the present invention active during an attempt to shutdown the main application processor to a suspend-to-disk (OFF or D3) condition from a suspend-to-RAM condition is shown in FIG. 6. Proper shutdown to the OFF condition is important in order to ensure minimal to no current consumption during long term non-use at the expense of having a long boot-up time the next time the vehicle ignition switch is activated.

In state 80, the main application processor is in a suspend-to-RAM condition. Both the main application microprocessor and the reduced power microprocessor detect passage of a long duration time period (e.g., 24 hours). Preferably, the time period measured by the reduced power microprocessor is slightly longer, so that if the main application microprocessor functions properly, it will perform the suspend-to-disk operation (e.g., transferring RAM contents to a compact flash drive) on its own. When the slightly longer time period measured by the reduced power microprocessor expires, a transition is made in state 81 where it checks status lines SUS A, B, and C, to determine the power state of the main application processor. If these lines indicate an OFF state, then the suspend-to disk has already been executed and no further action is taken. However, if these lines indicate a SUSPEND state, then the reduced power microprocessor initiates a wake-up sequence (resume event) to the main application processor/chipset in state 82 so that a shutdown-to-disk command can be executed by the main application processor. Status lines SUS A, B, and C, are checked in state 83 to verify that a full-on or run state has been entered. If the run state is achieved, then a suspend-to-disk (STD) command is transmitted in state 84. Otherwise, the wake-up sequence (resume event) is retried up to 3 more times in state 85 (after sufficient waiting periods). After the last try and if the run condition is still not achieved, then regulated voltages are turned off to the main application microprocessor in state 86.

Once the run state is achieved and the STD command transmitted in state 84, status lines SUS A, B, and C, are checked in state 87 to verify that the OFF state has been entered. If not, then the STD command is retried 3 more times in state 88. If the OFF state is still not achieved, then a reset signal is sent in state 89, another STD command is sent in state 90, and a final status check is made of status lines SUS A, B, and C, in state 91. If the OFF state is still not achieved, then power to the main application microprocessor is turned off in state 92.

What is claimed is:

1. A method of powering a vehicle information, communication, and entertainment system which provides mobile operation of information, communication, and entertainment devices in a vehicle, said vehicle having a vehicle powered state and a vehicle unpowered state, said method comprising the steps of:

operating a power management chipset mounted on a main motherboard to control power to a main application microprocessor and a random access memory mounted on said main motherboard;

supplying a plurality of regulated voltages from a power controller and regulator to said power management chipset;

switching on and off said regulated voltages under control of a reduced power microprocessor in response to a user control and whether said vehicle is in said vehicle powered state or said vehicle unpowered state;

periodically transmitting a status message from said main application microprocessor to said reduced power microprocessor during normal full-powered operation of said main application microprocessor;

establishing a predetermined time period in said reduced power microprocessor during which a status message is expected to be received from said main application microprocessor; and sending a reset signal from said reduced power microprocessor to said main application microprocessor if said status message is not received during said predetermined time period.

2. The method of claim 1 further comprising the steps of:

establishing a further predetermined time period in said reduced power microprocessor after sending said reset signal during which a status message is expected to be received from said main application microprocessor;

cycling said regulated voltages off and then back on to said main application microprocessor if said status message is not received during said further predetermined time period; and restarting said main application microprocessor.

3. The method of claim 1 wherein, when said main application microprocessor is not in a full-powered operating state, said reduced power microprocessor monitors conditions which should wake said main application microprocessor into said full-powered operating state, and wherein said method further comprises the steps of:

said reduced power microprocessor determining whether said main application microprocessor has correctly assumed said full-powered operating state;

sending a wake-up sequence from said reduced power microprocessor to said main application microprocessor when it has not correctly assumed said full-powered operating state;

resending said wake-up sequence from said reduced power microprocessor to said main application microprocessor if it again fails to assume said full-powered operating state;

cycling said regulated voltages off and then back on to said main application microprocessor if it again fails to assume said full-powered operating state; and resending said wake-up sequence from said reduced power microprocessor to said main application microprocessor.

4. The method of claim 1 wherein, when said main application microprocessor is in a full-powered operating state, said reduced power microprocessor monitors conditions which should shut down said main application microprocessor into a suspended operating state, and wherein said method further comprises the steps of:

said reduced power microprocessor determining whether said main application microprocessor has correctly assumed said suspended operating state;

sending a shutdown message from said reduced power microprocessor to said main application microprocessor when it has not correctly assumed said suspended operating state;

resending said shutdown message from said reduced power microprocessor to said main application microprocessor if it again fails to assume said suspended operating state;

sending a reset signal from said reduced power microprocessor to said main application microprocessor if it again fails to assume said suspended operating state; and resending said shutdown message from said reduced power microprocessor to said main application microprocessor.

5. The method of claim 4 further comprising the step of:

turning off said regulated voltages if said main application microprocessor again fails to assume said suspended operating state.

6. The method of claim 1 wherein, when said main application microprocessor is in a suspend-to-RAM operating state, said reduced power microprocessor measures an extended time period after which said main application microprocessor should perform a suspend-to-disk operation, and wherein said method further comprises the steps of:

said reduced power microprocessor determining whether said main application microprocessor has correctly assumed a suspend-to-disk operating state;

sending a wake-up sequence from said reduced power microprocessor to said main application microprocessor when it has not correctly assumed said suspend-to-disk operating state;

sending a suspend-to-disk message from said reduced power microprocessor to said main application microprocessor;

resending said suspend-to-disk message from said reduced power microprocessor to said main application microprocessor if it fails to assume said suspend-to-disk operating state;

sending a reset signal from said reduced power microprocessor to said main application microprocessor if it again fails to assume said suspend-to-disk operating state;

sending a suspend-to-disk message from said reduced power microprocessor to said main application microprocessor; and turning off said regulated voltages if said main application microprocessor again fails to assume said suspend-to-disk operating state.

* * * * *